(12) United States Patent
Tian et al.

(10) Patent No.: US 12,519,697 B2
(45) Date of Patent: Jan. 6, 2026

(54) NETWORK CONFIGURATION METHOD AND APPARATUS

(71) Applicant: Siemens Aktiengesellschaft, Munich (DE)

(72) Inventors: De Yu Tian, Hubei (CN); Qi Wang, Hubei (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/114,553

(22) PCT Filed: Sep. 27, 2022

(86) PCT No.: PCT/CN2022/121753
§ 371 (c)(1),
(2) Date: Mar. 24, 2025

(87) PCT Pub. No.: WO2024/065182
PCT Pub. Date: Apr. 4, 2024

(65) Prior Publication Data
US 2025/0267066 A1    Aug. 21, 2025

(51) Int. Cl.
*H04L 41/0893*    (2022.01)
(52) U.S. Cl.
CPC .................. *H04L 41/0893* (2013.01)
(58) Field of Classification Search
CPC ... G06F 9/54; H04L 41/0894; H04L 41/0803; H04L 41/0806; H04L 41/084;
(Continued)

(56) References Cited

U.S. PATENT DOCUMENTS 10,476,738 B1 * 11/2019 Sharifi Mehr ...... H04L 41/0893
11,394,627 B1 *  7/2022 Trapani .................. H04L 43/04
(Continued)

FOREIGN PATENT DOCUMENTS

CN    107454207 A    12/2017
CN    110601949 A    12/2019
(Continued)

OTHER PUBLICATIONS

Search Report for International Application No. PCT/CN2022/121753, 8 pages, Jun. 20, 2023.

*Primary Examiner* — David R Lazaro
(74) *Attorney, Agent, or Firm* — Slayden Grubert Beard PLLC

(57) ABSTRACT

Various embodiments of the teachings herein include a network configuration method. An example includes: acquiring environmental information of two application programs, information indicating hosts where the application programs are located and a communication mode between them; grouping the two application programs according to the information to obtain a program group, wherein each program group comprises at least two application programs, different program groups correspond to different inter-program communication modes, and the application programs in the same program group communicate with each other through the inter-program communication mode corresponding to the program group; determining at least one application program pair that needs to perform communication; and configuring, according to the inter-program communication mode corresponding to the program group comprising the application program pair, a communication network for the two application programs comprised in the application program pair.

10 Claims, 6 Drawing Sheets

(58) Field of Classification Search
CPC . H04L 41/08; H04L 41/0843; H04L 41/0893; H04L 41/12
See application file for complete search history.

(56) References Cited

U.S. PATENT DOCUMENTS

| | | | | |
|---|---|---|---|---|
| 2007/0274230 | A1* | 11/2007 | Werber | H04L 45/00 370/254 |
| 2007/0274285 | A1* | 11/2007 | Werber | H04L 41/0843 370/351 |
| 2014/0095718 | A1* | 4/2014 | Daly | G06F 9/5033 709/226 |
| 2016/0294650 | A1* | 10/2016 | Padhye | H04L 41/22 |
| 2017/0220364 | A1* | 8/2017 | Kadioglu | G06F 9/5027 |
| 2018/0359218 | A1 | 12/2018 | Church | |
| 2019/0356743 | A1* | 11/2019 | Park | H04W 4/70 |
| 2020/0089547 | A1* | 3/2020 | Rempel | G16Y 10/45 |
| 2022/0197355 | A1* | 6/2022 | Choi | G06F 1/206 |
| 2023/0224228 | A1* | 7/2023 | Dahu | H04L 41/5022 709/223 |
| 2025/0267066 | A1* | 8/2025 | Tian | H04L 41/0893 |

FOREIGN PATENT DOCUMENTS

| | | | |
|---|---|---|---|
| CN | 111294827 | A | 2/2020 |
| CN | 111885075 | A | 11/2020 |

* cited by examiner

NETWORK CONFIGURATION METHOD AND APPARATUS

CROSS-REFERENCE TO RELATED APPLICATIONS

This application is a U.S. National Stage Application of International Application No. PCT/CN2022/121753 filed Sep. 27, 2022, which designates the United States of America, the contents of which are hereby incorporated by reference in their entirety.

TECHNICAL FIELD

The present application relates to network communications. Various embodiments of the teachings herein include network configuration methods and apparatus, electronic devices, and storage media.

BACKGROUND

Containers are a mainstream way to deploy application programs. Containers use a sandbox mechanism, and there are no interfaces between them. That is, application programs are isolated from the outside world when they are running in containers. Data exchange between containers and hosts or between containers requires data distribution services. Therefore, it is necessary to configure a communication network for data distribution services of application programs running in the containers and the hosts.

Currently, network engineers manually configure the communication network for data distribution services of the application programs. However, network configuration is a complex and professional task. When configuring communication networks, avoiding the risk of network attacks and achieving better data exchange performance and balance requires network engineers to spend a large amount of time on testing and verification. Therefore, when configuring a communication network for a large number of application programs, the manual labor is high and the time is long, and thus, the existing network configuration methods are not applicable to configuring the communication network for the large number of application programs.

SUMMARY

In view of this, the present disclosure describes network configuration methods and apparatus, electronic devices, and storage media which are applicable to configuring a communication network for a large number of application programs. For example, some embodiments of the teachings herein include a network configuration method comprising: acquiring environmental information of at least two application programs, wherein the environmental information is used to indicate hosts where the application programs are located and a communication mode between the hosts; grouping the at least two application programs according to the environmental information to obtain at least one program group, wherein each of the program groups comprises at least two application programs, different program groups correspond to different inter-program communication modes, and the application programs in the same program group communicate with each other through the inter-program communication mode corresponding to the program group; determining, according to a communication requirement between the at least two application programs, at least one application program pair that needs to perform communication; and configuring, according to the inter-program communication mode corresponding to the program group comprising the application program pair, a communication network for the two application programs comprised in the application program pair.

In some embodiments, grouping the at least two application programs according to the environmental information to obtain the at least one program group comprises: performing at least one of the following operations according to the environmental information: (i) dividing the application programs located on the same host into one program group; and (ii) grouping the application programs located on different hosts according to communication modes between the hosts to obtain at least one program group.

In some embodiments, grouping the application programs located on different hosts according to the communication modes between the hosts to obtain the at least one program group comprises: dividing at least two application programs located on different hosts into one program group, the hosts communicating with each other through the same local area network; and dividing at least two application programs located on different hosts into one program group, the hosts communicating with each other through a wide area network.

In some embodiments, configuring, according to the inter-program communication mode corresponding to the program group comprising the application program pair, the communication network for the two application programs comprised in the application program pair comprises: if the application program pair is comprised in a first program group, configuring the communication network for the two application programs comprised in the application program pair through a pre-created memory exchange configuration template, so that the application program pair performs communication through memory exchange, wherein the application programs in the first program group are located on the same host; if the application program pair is comprised in a second program group, configuring the communication network for the two application programs comprised in the application program pair through a pre-created local area network configuration template, so that the application program pair performs communication through a local area network, wherein the application programs in the second program group are located on different hosts that communicate with each other through the local area network; and if the application program pair is comprised in a third program group, configuring the communication network for the two application programs comprised in the application program pair through a pre-created wide area network configuration template, so that the application program pair performs communication through a wide area network, wherein the application programs in the third program group are located on different hosts that communicate with each other through the wide area network.

In some embodiments, the method further comprises: if an operating environment of the application program is a container, configuring a bridge network for the application program, so that the application program accesses, through the bridge network, a default network and a memory of a host where the application program is located.

In some embodiments, the method further comprises: generating configuration information, wherein the configuration information is used to indicate program group information, application program pair information, and communication network configuration information; and generating a configuration list comprising the configuration information, and outputting the configuration list.

As another example, some embodiments include a network configuration apparatus comprising: an acquisition module for acquiring environmental information of at least two application programs, wherein the environmental information is used to indicate hosts where the application programs are located and a communication mode between the hosts; a grouping module for grouping the at least two application programs according to the environmental information to obtain at least one program group, wherein each of the program groups comprises at least two application programs, different program groups correspond to different communication modes, and the application programs in the same program group communicate with each other through the communication mode corresponding to the program group; a pairing module for determining, according to a communication requirement between the at least two application programs, at least one application program pair that needs to perform communication; and a configuration module for configuring, according to the communication mode corresponding to the program group comprising the application program pair, a communication network for the two application programs comprised in the application program pair.

In some embodiments, the network configuration apparatus further comprises: a first generation module for generating configuration information, wherein the configuration information is used to indicate program group information, application program pair information, and communication network configuration information; and a second generation module for generating a configuration list comprising the configuration information, and outputting the configuration list.

As another example, some embodiments include an electronic device comprising: a processor, a communication interface, a memory and a communication bus, wherein the processor, the memory and the communication interface communicate with each other via the communication bus; and the memory is used to store at least one executable instruction, and the executable instruction causes the processor to perform an operation corresponding to the network configuration method provided in the first aspect described above.

As another example, some embodiments include a computer-readable storage medium, having a computer instruction stored thereon, wherein the computer instruction, when executed by a processor, causes the processor to perform an operation corresponding to one or more of the network configuration methods described herein.

As another example, some embodiments include a computer program product stored on a non-transitory computer-readable medium and comprising computer-executable instructions, wherein the computer-executable instructions, when executed, cause at least one processor to perform one or more of the network configuration methods described herein.

According to the above technical solutions, application programs are divided into a plurality of program groups according to different environmental information of the application programs, i.e., different hosts where the application programs are located and different communication modes between the hosts. Therefore, each program group can correspond to an inter-program communication mode, and a large number of application programs can be divided into a limited number of program groups. The communication mode of each application program pair is determined according to the inter-program communication mode of the program group where the application program pair is located. There is no need to manually determine the communication mode between the application programs, which reduces the intensity of manual labor. In addition, since the process of configuring the communication network for the application programs is automatically executed by the system without manual intervention, the time spent on configuring a communication network for a large number of application programs can be reduced. Therefore, this method is applicable to configuring a communication network for a large number of application programs.

LIST OF REFERENCE NUMERALS

Figure 1:
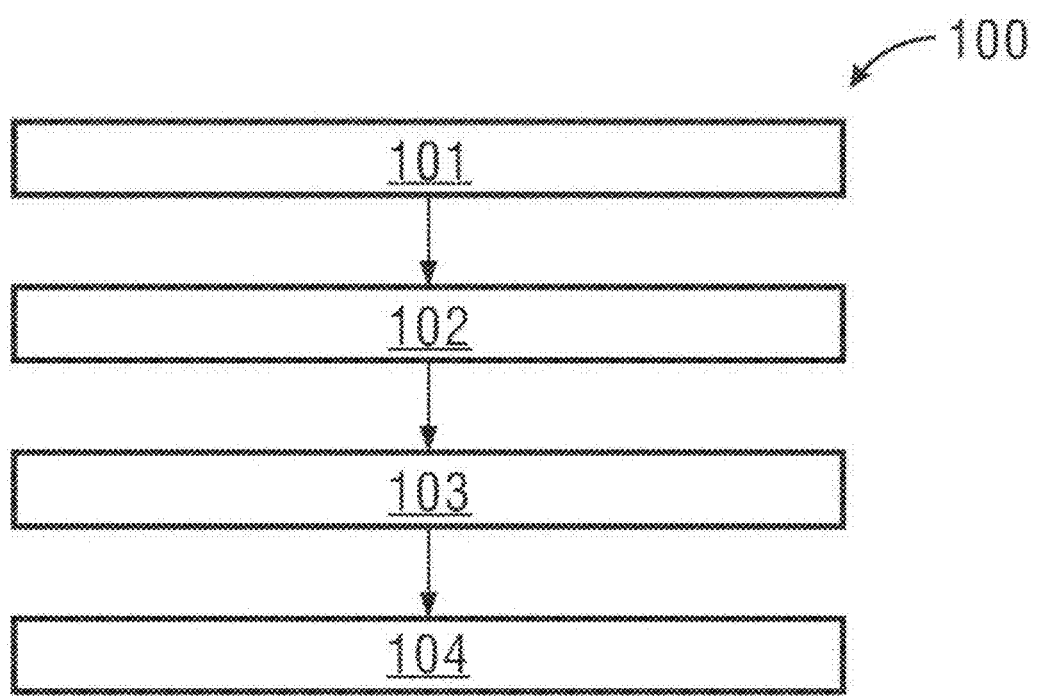
FIG. 1 is a flowchart of an example network configuration method incorporating teachings of the present disclosure.

101: Acquire environmental information of at least two application programs
102: Group the at least two application programs according to the environmental information to obtain at least one program group
103: Determine, according to a communication requirement between the application programs, at least one application program pair that needs to perform communication
104: Configure a communication network for the application programs according to an inter-program communication mode of the program group where the application program pair is located
105: Generate configuration information
106: Generate a configuration list including the configuration information and output the configuration list

| 100: Network configuration method | 201-204: Application program | 205: First host |
|---|---|---|
| 206: Second host | 207: Cloud | 400: Network configuration apparatus |
| 401: Acquisition module | 402: Grouping module | 403: Pairing module |
| 404: Configuration module | 405: First generation module | 406: Second generation module |
| 600: Electronic device | 602: Processor | 604: Communication interface |
| 606: Memory | 608: Communication bus | 610: Program |
| N: Memory communication | G: Wide area network communication | J: Local area network communication |

DETAILED DESCRIPTION

As described previously, containers are a mainstream way to deploy application programs. Containers use a sandbox mechanism and there are no interfaces between them. That is, application programs are isolated from the outside world when they are running in containers. Performing data exchange between containers and hosts or between containers requires data distribution services. Therefore, it is necessary to configure a communication network for data distribution services of application programs running in the containers and the hosts.

Currently, network engineers manually configure the communication network for data distribution services of the application programs. However, network configuration is a complex and professional task. When configuring the communication network, avoiding the risk of network attacks and achieving better data exchange performance and balance requires network engineers to spend a large amount of time on testing and verification. Therefore, when configuring a communication network for a large number of application programs by applying the existing network configuration methods, the manual labor is high and the time is long, and thus, the existing network configuration methods are not applicable to configuring the communication network for the large number of application programs.

In some embodiments, environmental information of application programs is acquired, and the application programs are grouped according to the environmental information to obtain program groups. Then, an application program pair is determined according to a communication requirement between the application programs, and a network is configured for the application programs in the application program pair according to an inter-program communication mode corresponding to the program group in which the application program pair is located.

As can be seen, the application programs are divided into a plurality of program groups according to different environmental information of the application programs, i.e., different hosts where the application programs are located and different communication modes between the hosts. Therefore, each program group can correspond to an inter-program communication mode, and a large number of application programs can be divided into a limited number of program groups. The communication mode of each application program pair is determined according to the inter-program communication mode of the program group where the application program pair is located. There is no need to manually determine the communication mode between the application programs, which reduces the intensity of manual labor.

The process of configuring the communication network for the application programs is automatically executed by the system without manual intervention, which can reduce the time spent on configuring a communication network for a large number of application programs. Therefore, this method is applicable to configuring the communication network for the large number of application programs.

A network configuration method and apparatus, and an electronic device provided in the embodiments of the present application will be described in detail below with reference to the accompanying drawings.

Network Configuration Method

FIG. 1 is a flowchart of an example network configuration method incorporating teachings of the present disclosure. As shown in FIG. 1, the network configuration method 100 includes the following steps:

Step 101: Acquire environmental information of at least two application programs, wherein the environmental information is used to indicate hosts where the application programs are located and a communication mode between the hosts. The environmental information of the application programs is determined according to behaviors of a plurality of application programs, and the behaviors of the application programs: include: interactive behaviors, networking behaviors, etc. The environmental information is used to indicate the hosts where the application programs are located and the communication mode between the hosts, and the communication mode includes but is not limited to host network communication, local area network communication, etc.

It should be understood that since a plurality of application programs may come from a plurality of hosts, the environmental information includes the communication mode between different hosts. If the plurality of application programs come from the same host and the host does not need to communicate with other hosts, the environmental information includes the hosts where the plurality of application programs are located.

Step 102: Group the at least two application programs according to the environmental information to obtain at least one program group, wherein each of the program groups includes at least application programs, different program groups correspond to different inter-program communication modes, and the application programs in the same program group communicate with each other through the inter-program communication mode corresponding to the program group. The application programs are grouped according to the environmental information of the application programs. A plurality of application programs that communicate with each other through the same communication mode are divided into one program group. Different program groups correspond to different inter-program communication modes. The communication modes between application programs are different according to different environmental information, namely, different hosts where the application programs are located and different communication modes between the hosts. For example, if two application programs are located on the same host, they communicate with each other through the host. If the two application programs are located on different hosts, they communicate with each other through a network, and so on.

Step 103: Determine, according to a communication requirement between the at least two application programs, at least one application program pair that needs to perform communication. A plurality of application programs that need to perform communication are determined, and the plurality of application programs that need to perform communication are paired two by two to obtain a plurality of application program pairs.

It should be noted that the communication requirement between application programs needs to be determined manually. The communication requirement is set manually according to the dependencies between the application programs and a data exchange requirement. For example, if the use of a first application program needs to depend on a second application program, then the first application program and the second application program are set to have a communication requirement. After the system identifies the requirement, the first application program and the second application program are determined as an application program pair.

Step 104: Configure, according to the inter-program communication mode corresponding to the program group including the application program pair, a communication network for the two application programs included in the application program pair. According to the different communication mode of an application program group where each application program pair is located, a communication network is configured for the two application programs included in the application program pair, and the configured network corresponds to the inter-program communication mode corresponding to the program group. For example, if the inter-program communication mode corresponding to the program group is local area network communication, then a local area network network is configured for the two application programs included in the application program pair.

It should be understood that since there may be a case where there is a need for communication between the same application program and different application programs, one application program may be divided into different program groups. Different program groups correspond to different inter-program communication modes, so the same application program may be configured with a plurality of networks. For example, a first application program needs to perform communication with a second application program on the same host and a third application program on a different host. When network configuration is performed for the first application program, the first application program will be configured with a same-host communication network and a different-host communication network.

In some embodiments, application programs are divided into a plurality of program groups according to different environmental information of the application programs, i.e., different hosts where the application programs are located and different communication modes between the hosts. Therefore, each program group can correspond to an inter-program communication mode, and a large number of application programs can be divided into a limited number of program groups. The communication mode of each application program pair is determined according to the inter-program communication mode of the program group where the application program pair is located. There is no need to manually determine the communication mode between the application programs, which reduces the intensity of manual labor. In addition, since the process of configuring the communication network for the application programs is automatically executed by the system without manual intervention, the time spent on configuring a communication network for a large number of application programs can be reduced. Therefore, this method is applicable to configuring the communication network for the large number of application programs.

In some embodiments, when the at least two application programs are grouped according to the environmental information to obtain at least one program group, at least one of the following operations may be performed according to the environmental information:
(i) dividing the application programs located on the same host into one program group; and
(ii) grouping the application programs located on different hosts according to communication modes between the hosts to obtain at least one program group.

Different hosts cannot communicate with each other directly and need to communicate with each other through a network. Therefore, the data exchange between application programs on different hosts needs to depend on the communication mode of the hosts where the application programs are located. When grouping, application programs on the same host are divided into one group, that is, the application programs in the program group communicate with each other through the host. Application programs on different hosts are divided into different program groups according to different communication modes, that is, the application programs in the program groups communicate with each other through the communication mode between different hosts where the application programs are located.

In some embodiments, application programs located on the same host are divided into one program group, and application programs located on different hosts are divided into a plurality of program groups according to the communication mode between the hosts. Thus, the application programs can be accurately divided into corresponding program groups when grouping, avoiding the situation where the application programs on different hosts are divided into a program group corresponding to application programs on the same host due to an application program grouping error, causing communication failures between the application programs. Performing network configuration for the application programs according to the program groups is more accurate, thereby improving the accuracy and efficiency of network configuration of the application programs.

In some embodiments, when grouping the application programs located on different hosts according to the communication modes between the hosts to obtain the at least one program group, at least two application programs located on different hosts are divided into one program group, the hosts communicating with each other through the same local area network; and at least two application programs located on different hosts are divided into one program group, the hosts communicating with each other through a wide area network.

In some embodiments, application programs located on different hosts are grouped according to the communication modes between different hosts, so that different communication networks can be configured for application programs located on different hosts according to the different inter-program communication modes corresponding to the groups, which refines grouping rules, makes the network configuration of the application programs more accurate, and improves the efficiency of configuring communication networks for a large number of application programs.

In some embodiments, when configuring, according to the inter-program communication mode corresponding to the program group including the application program pair, a communication network for the two application programs included in the application program pair, if the application program pair is included in a first program group, the communication network is configured for the two application programs included in the application program pair through a pre-created memory exchange configuration template, so that the application program pair performs communication through memory exchange, wherein the application programs in the first program group are located on the same host;

The memory exchange configuration template is pre-created. The memory exchange configuration template corresponds to the program group to which the application programs on the same host are divided. The template may configure a memory exchange communication mode for two application programs on the same host that need to perform communication. That is, when two application programs are located on the same host, they do not need a network to perform communication and can exchange data by sharing the host's memory.

In some embodiments, if an application program is running in a container, an "--ipc=host" command is added to a docker run script to connect the container to the host's memory, so that memory exchange communication can be configured between containers running on the same host or between a container and a local application program running on the same host.

In some embodiments, when two application programs that need to perform communication are located on the same host, the communication mode between the two application programs is configured through the memory exchange configuration template, so that the application programs on the same host can communicate with each other by sharing the host's memory, thereby achieving optimal communication performance when the two application programs on the same host communicate with each other, and improving the practicality of the network configuration method.

In some embodiments, when configuring, according to the inter-program communication mode corresponding to the program group including the application program pair, a communication network for the two application programs included in the application program pair, if the application program pair is included in a second program group, the communication network is configured for the two application programs included in the application program pair through a pre-created local area network configuration template, so that the application program pair performs communication through a local area network, wherein the application programs in the second program group are located on different hosts that communicate with each other through the local area network.

The local area network configuration template is pre-created. The local area network configuration template corresponds to the program group to which the application programs located on different hosts are divided, the hosts communicating with each other through the same local area network. The template can configure local area network communication for two application programs located on different hosts that need to perform communication, that is, when the two application programs are located on different hosts, data is exchanged through a local area network.

Specifically, an ipvlan or macvlan network may be configured for two application programs to optimize network performance and security during communication. It should be understood that IPvlan is a new transformation in network virtualization technology. Linux implementation is lightweight because instead of using the traditional Linux bridge for isolation, it is associated with a Linux Ethernet interface or sub-interface to enforce separation between networks and connection with a physical network. IPvlan provides many unique features and provides ample room for further innovation in various modes.

It should also be understood that when an application program is running in a container, the macvlan network driver may be used to assign a MAC address to each container's virtual network interface, making it appear to be a physical network interface directly connected to a physical network. In this case, a physical interface may be specified on the container host for configuring macvlan, as well as a subnet and gateway of the macvlan.

In some embodiments, when two application programs that need to perform communication are located on different hosts and the communication mode between the hosts is local area network communication, the communication mode between the two application programs is configured through a local area network configuration template, so that the two application programs communicate through a local area network, thereby configuring the communication network for application programs on different hosts. Moreover, during configuration, the system automatically configures the network for the application programs according to the preset local area network configuration template without manual intervention, so that the network configuration method can be applied to performing network configuration for a large number of application programs.

In some embodiments, when configuring, according to the inter-program communication mode corresponding to the program group including the application program pair, a communication network for the two application programs included in the application program pair, if the application program pair is included in a third program group, the communication network is configured for the two application programs included in the application program pair through a pre-created wide area network configuration template, so that the application program pair performs communication through a wide area network, wherein the application programs in the third program group are located on different hosts that communicate with each other through the wide area network.

The wide area network configuration template is pre-created. The wide area network configuration template corresponds to the program group to which the application programs located on different hosts are divided, the hosts communicating with each other through the wide area network. The template can configure wide area network communication for two application programs located on different hosts that need to perform communication, that is, when two application programs are located on different hosts, data is exchanged through a wide area network.

In some embodiments, an Overlay network or a 3rd party plug-in Weave network may be configured for application programs to perform communication between the application programs. It should be understood that an Overlay network driver may create a distributed network between a plurality of hosts. This network is overlaid on the networks of the hosts, allowing the connected hosts to perform secure communication.

It should also be understood that a Weave Net may create a virtual network that can connect containers on a plurality of hosts across the hosts. With the help of the Weave Net, micro service-based application programs can run anywhere, such as on one host or a plurality of hosts, or even in the cloud and data centers.

In some embodiments, if an application program needs to run in a secure network environment, it may be disconnected from a wide area network. For example, a database running on both a local area network and a wide area network may be given access to another application program running on the same local area network and disconnected from the wide area network to prevent network attacks.

In some embodiments, when two application programs that need to perform communication are located on different hosts and the communication mode between the hosts is wide area network communication, the communication mode between the two application programs is configured through a wide area network configuration template, so that the two application programs communicate through a wide area network, thereby configuring the communication network for application programs on different hosts. Moreover, during configuration, the system automatically configures the network for the application programs according to the preset wide area network configuration template without manual intervention, so that the network configuration method can be applied to perform network configuration for a large number of application programs.

Figure 2:
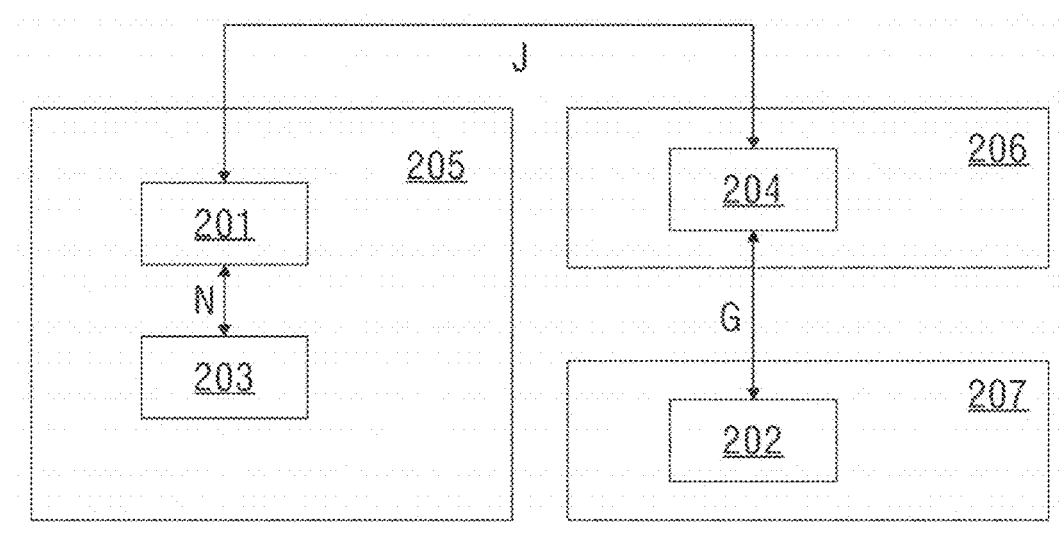
FIG. 2 is a topological diagram of an example network configuration incorporating teachings of the present disclosure.

Illustratively FIG. 2 is a topological diagram of an example network configuration incorporating teachings of the present disclosure. As shown in FIG. 2, an application program 201 and an application program 203 need to perform communication, and both are located on a first host 205. Therefore, memory exchange communication N is configured for the application program 201 and the application program 203. The application program 201 and an application program 204 need to perform communication, the application program 201 is located on the first host 205, the application program 204 is located on a second host 206, and the first host 205 and the second host 206 are on a local area network. Therefore, local area network communication J is configured for the application program 201 and the application program 204. The application program 202 and the application program 204 need to perform communication, the application program 202 runs in a cloud 207, and the application program 204 is located on the second host 206. Therefore, wide area network communication G is configured for the application program 202 and the application program 204.

In some embodiments, if an operating environment of an application program is a container, a bridge network is configured for the application program, so that the application program accesses, through the bridge network, a default network and a memory of a host where the application program is located.

Since the application program is isolated from the outside world when running in a container, the operating environment of the application program when it is running is detected. If the operating environment of the application program is a container, a bridge network is set for the container so that the container can be connected to the host where the application program is located, through the bridge network.

It should be understood that a host network is a default network of the host, and application programs running directly on the host may use the host network by default without configuration. Application programs running in a container may specify network parameters (--network=host) when starting the container, which allows the container to use the host network through the bridge network.

In some embodiments, an operating environment of an application program is detected. If the application is running in a container, a bridge network is set for the container so that the container can be connected to a host where the application program is located, through the bridge network. Therefore, the application program running in the container can exchange data with other application programs through the host, which thus allows the application program running locally on the host and the application program running in the container to perform network configuration with the same configuration rules, thereby reducing the complexity of network configuration and improving the efficiency of network configuration for a large number of application programs.

Figure 3:
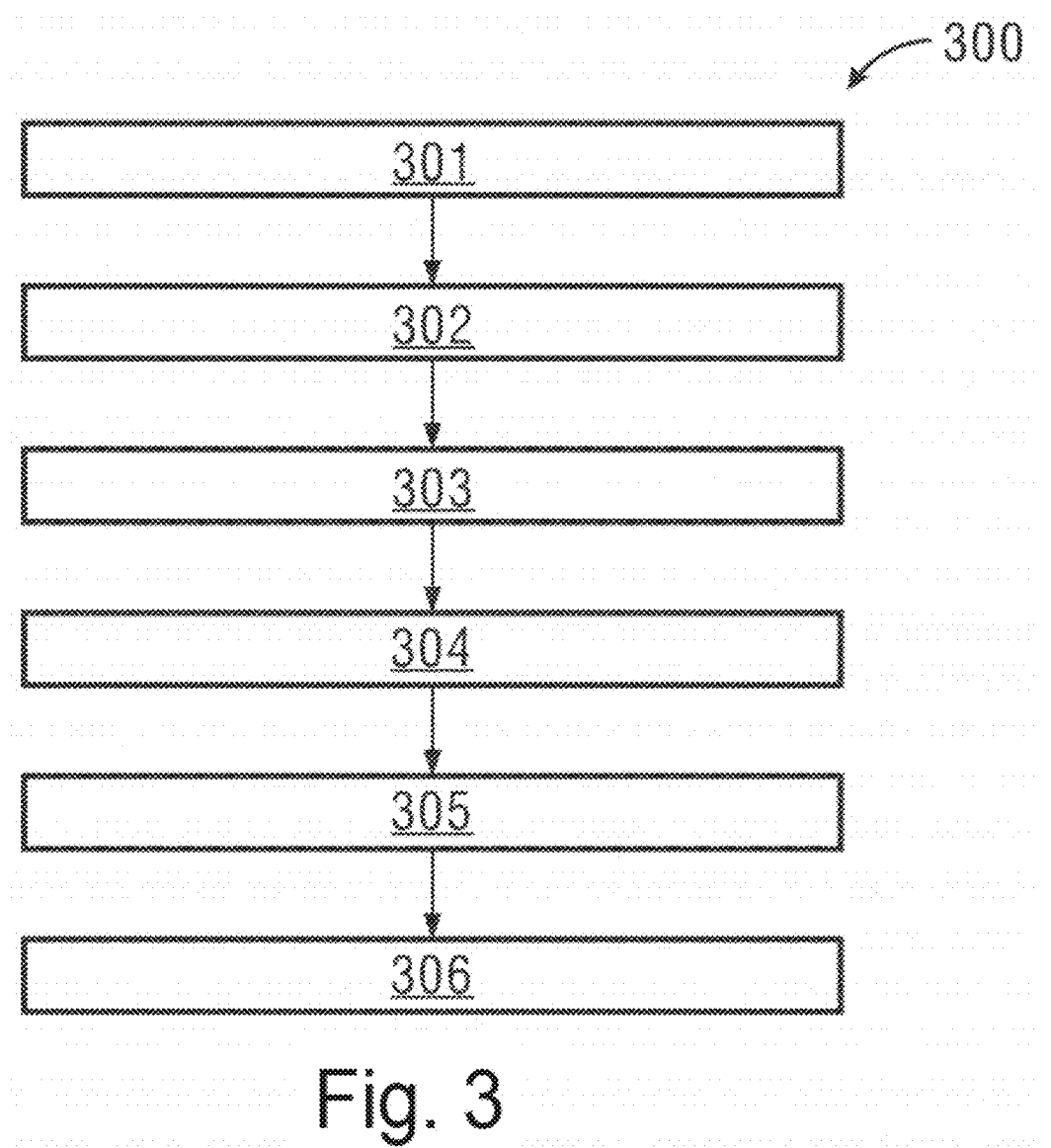
FIG. 3 is a flowchart of another example network configuration method incorporating teachings of the present disclosure.

FIG. 3 is a flowchart of another example network configuration method incorporating teachings of the present disclosure. As shown in FIG. 3, the network configuration method 300 further includes the following steps:

Step 301: Acquire environmental information of at least two application programs, wherein the environmental information is used to indicate hosts where the application programs are located and a communication mode between the hosts.

Step 302: Group the at least two application programs according to the environmental information to obtain at least one program group, wherein each of the program groups includes at least two application programs, different program groups correspond to different inter-program communication modes, and the application programs in the same program group communicate with each other through the inter-program communication mode corresponding to the program group.

Step 303: Determine, according to a communication requirement between the at least two application programs, at least one application program pair that needs to perform communication.

Step 304: Configure, according to the inter-program communication mode corresponding to the program group including the application program pair, a communication network for the two application programs included in the application program pair.

It should be noted that for steps 301 to 304 described above, reference may be made to steps 101 to 104 in the above embodiment, and they will not be repeated here.

Step 305: Generate configuration information, wherein the configuration information is used to indicate program group information, application program pair information, and communication network configuration information. Configuration information including program group information of each application program, application program pair information, and communication network configuration information of each application program is generated.

Step 306: Generate a configuration list including the configuration information and output the configuration list. The configuration information is output as a configuration list.

In some embodiments, program group information, application program pair information, and communication network configuration information are output as a configuration list. This list can help users diagnose faults in the configured network when the network configuration fails or the application program cannot use the configured network communication, thereby reducing the knowledge threshold and workload of network diagnosis and improving the practicality of the network configuration method.

Network Configuration Apparatus

Figure 4:
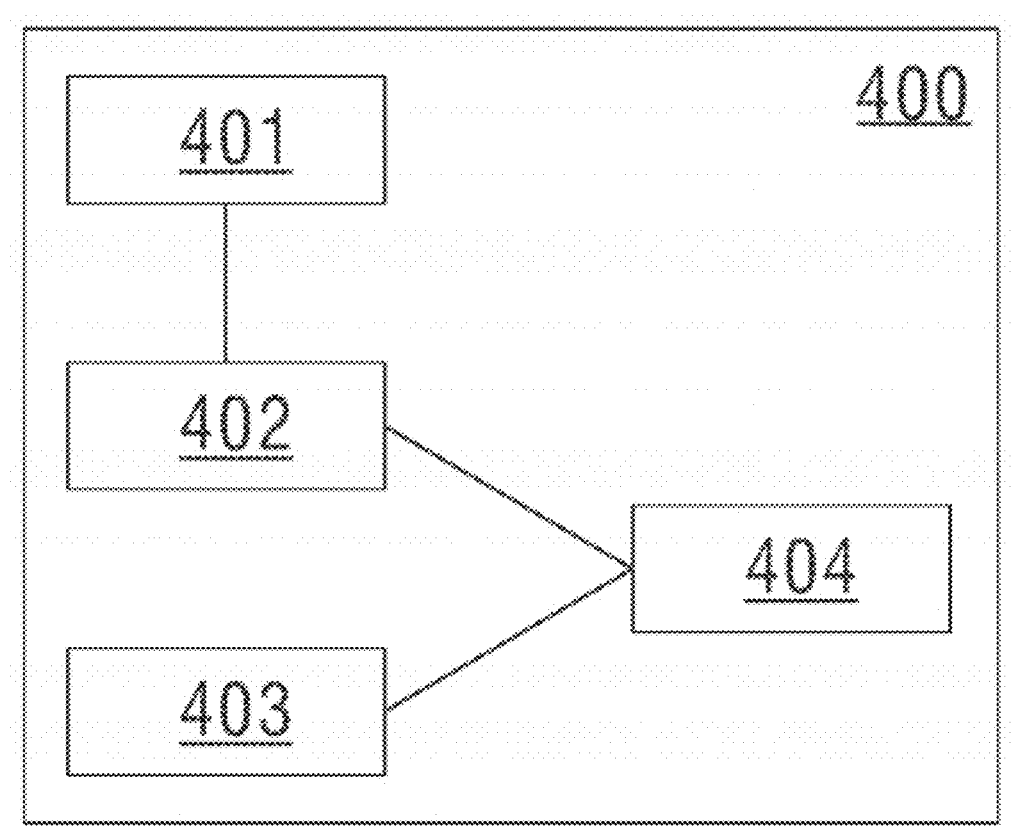
FIG. 4 is a schematic diagram of an example network configuration apparatus incorporating teachings of the present disclosure.

FIG. 4 is a schematic diagram of an example network configuration apparatus incorporating teachings of the present disclosure. As shown in FIG. 4, the network configuration apparatus 400 includes:

an acquisition module 401 for acquiring environmental information of at least two application programs, wherein the environmental information is used to indicate hosts where the application programs are located and a communication mode between the hosts;

a grouping module 402 for grouping the at least two application programs according to environmental information to obtain at least one program group, wherein each of the program groups includes at least two different application programs, program groups correspond to different communication modes, and the application programs in the same program group communicate with each other through the communication mode corresponding to the program group;

a pairing module 403 for determining, according to a communication requirement between the at least two application programs, at least one application program pair that needs to perform communication; and a configuration module 404 for configuring, according to the communication mode corresponding to the program group including the application program pair, a communication network for the two application programs included in the application program pair.

In some embodiments, the acquisition module 401 may be used to execute step 101 in the above method embodiment, the grouping module 402 may be used to execute step 102 in the above method embodiment, the pairing module 403 may be used to execute step 103 in the above method embodiment, and the configuration module 404 may be used to execute step 104 in the above method embodiment.

In some embodiments, the grouping module 402 may be used to perform at least one of the following operations according to the environmental information: (i) dividing the application programs located on the same host into one program group; and (ii) grouping the application programs located on different hosts according to communication modes between the hosts to obtain at least one program group.

In some embodiments, the grouping module 402 may be used to: divide at least two application programs located on different hosts into one program group, the hosts communicating with each other through the same local area network; and divide at least two application programs located on different hosts into one program group, the hosts communicating with each other through a wide area network.

In some embodiments, the grouping module 402 may be used to: if the application program pair is included in a first program group, configure the communication network for the two application programs included in the application program pair through a pre-created memory exchange configuration template, so that the application program pair performs communication through memory exchange, wherein the application programs in the first program group are located on the same host; if the application program pair is included in a second program group, configure the communication network for the two application programs included in the application program pair through a pre-created local area network configuration template, so that the application program pair performs communication through a local area network, wherein the application programs in the second program group are located on different hosts that communicate with each other through the local area network; and if the application program pair is included in a third program group, configure the communication network for the two application programs included in the application program pair through a pre-created wide area network configuration template, so that the application program pair performs communication through a wide area network, wherein the application programs in the third program group are located on different hosts that communicate with each other through the wide area network.

In some embodiments, if an operating environment of an application program is a container, configuring a bridge network for the application program, so that the application program accesses, through the bridge network, a default network and a memory of a host where the application program is located.

Figure 5:
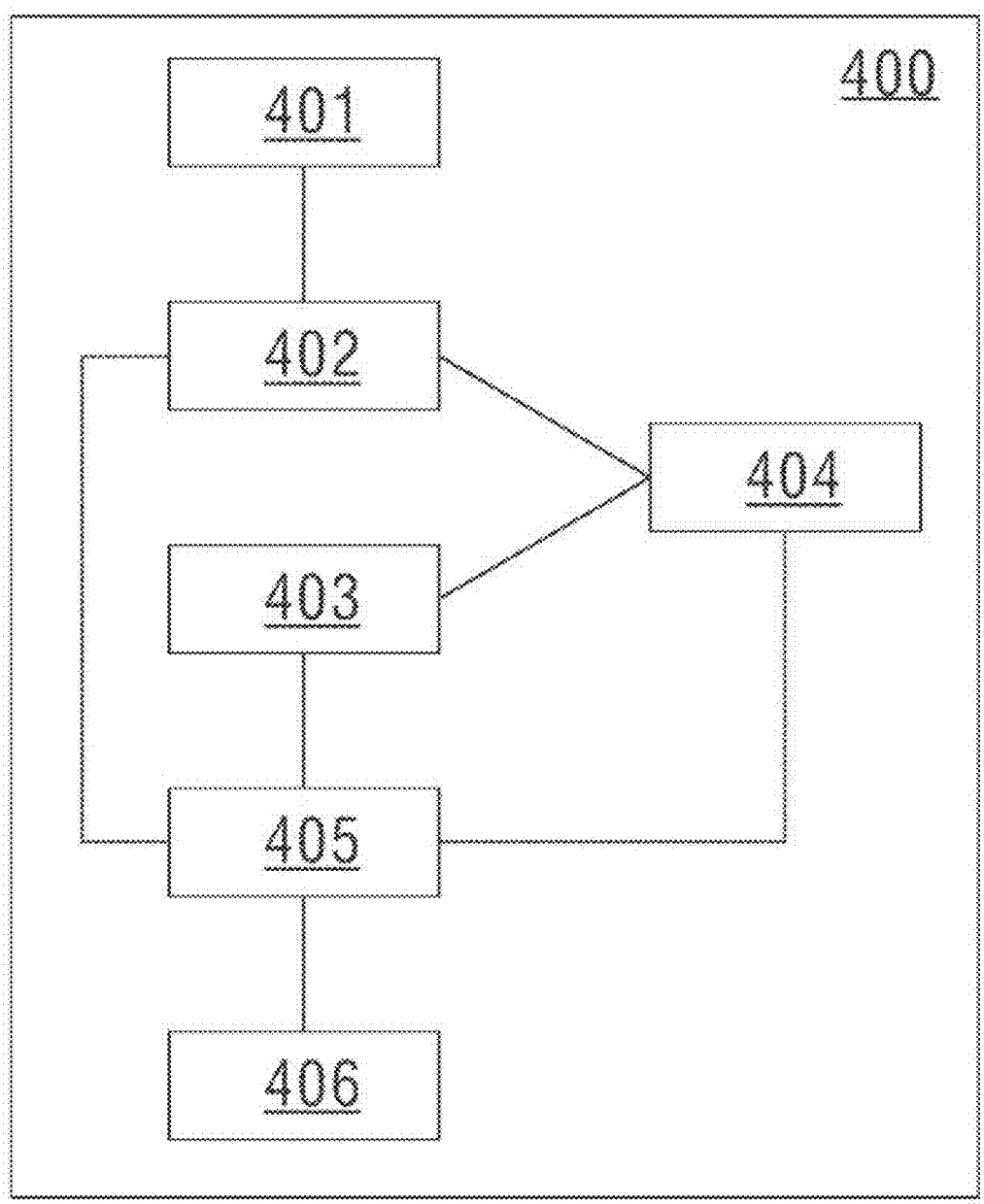
FIG. 5 is a schematic diagram of another example network configuration apparatus incorporating teachings of the present disclosure.

FIG. 5 is a schematic diagram of another example network configuration apparatus incorporating teachings of the present disclosure. As shown in FIG. 5, on the basis of the network configuration apparatus 400 shown in FIG. 4, the network configuration apparatus 400 further includes:

a first generation module 405 for generating configuration information, wherein the configuration information is used to indicate program group information, application program pair information, and communication network configuration information; and a second generation module 406 for generating a configuration list including configuration information, and outputting the configuration list.

In some embodiments, the acquisition module 401 may be used to execute step 301 in the above method embodiment, the grouping module 402 may be used to execute step 302 in the above method embodiment, the pairing module 403 may be used to execute step 303 in the above method embodiment, and the configuration module 404 may be used to execute step 304 in the above method embodiment, the first generation module 405 may be used to execute step 305 in the above method embodiment, and the second generation module 406 may be used to execute step 306 in the above method embodiment.

Electronic Device

Figure 6:
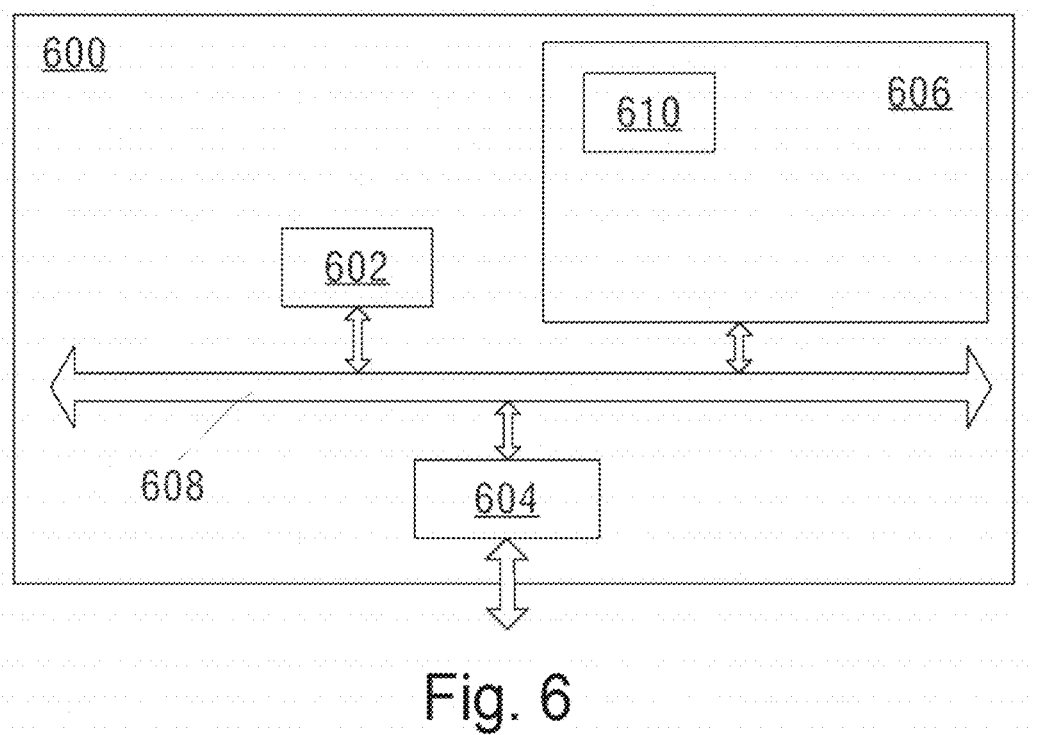
FIG. 6 is a schematic diagram of an example electronic device incorporating teachings of the present disclosure.

FIG. 6 is a schematic diagram of an example electronic device incorporating teachings of the present disclosure. The specific embodiment of the present application does not limit the specific implementation of the electronic device. Referring to FIG. 6, the electronic device 600 provided includes: a processor 602, a communication interface 604, a memory 606, and a communication bus 608. In the electronic device:

the processor 602, the communication interface 604, and the memory 606 communicate with each other via the communication bus 608.

The communication interface 604 is used to communicate with other electronic devices or servers.

The processor 602 is used to execute a program 610, and specifically, may execute the relevant steps in any one of the aforementioned network configuration method embodiments.

In some embodiments, the program 610 may include program codes, which include computer operation instructions.

The processor 602 may be a central processing unit (CPU), or an application specific integrated circuit (ASIC), or one or more integrated circuits configured to implement the embodiments of the present application. One or more processors included in a smart device may be processors of the same type, such as one or more CPUs; or processors of different types, such as one or more CPUs and one or more ASICs.

The memory 606 is used to store the program 610. The memory 606 may include a high-speed RAM memory, and may also include a non-volatile memory, such as at least one disk memory.

The program 610 may be specifically used to cause the processor 602 to execute the network configuration method in any one of the aforementioned embodiments.

Reference may be made to the corresponding description of the corresponding step and unit in any one of the aforementioned network configuration method embodiments, for the specific implementation of each step in the program 610, which will not be repeated here. It can be clearly understood by those skilled in the art that for the convenience and brevity of the description, reference may be made to the description of the corresponding process in the foregoing method embodiments for the specific working process of the devices and modules described above, which will not be repeated here.

With the electronic device described herein, application programs are divided into a plurality of program groups according to different environmental information of the application programs, i.e., different hosts where the application programs are located and different communication modes between the hosts. Therefore, each program group can correspond to an inter-program communication mode, and a large number of application programs can be divided into a limited number of program groups. The communication mode of each application program pair is determined according to the inter-program communication mode of the program group where the application program pair is located. There is no need to manually determine the communication mode between the application programs, which reduces the intensity of manual labor. Moreover, since the process of configuring the communication network for the application programs is automatically executed by the system without manual intervention, the time spent on configuring the communication network for a large number of application programs can be reduced. Therefore, this method is applicable to configuring a communication network for a large number of application programs.

Computer-Readable Storage Medium

The teachings of the present disclosure further include a computer-readable storage medium storing instructions for causing a machine to perform one or more of the network configuration methods as described herein. Specifically, a system or apparatus equipped with a storage medium may be provided, wherein software program codes implementing the functions of any one of the above embodiments are stored on the storage medium, and a computer (or CPU or MPU) of the system or apparatus reads and executes the program codes stored in the storage medium.

In this case, the program codes read from the storage medium itself can implement the function of any one of the above embodiments, so the program codes and the storage medium storing the program codes constitute part of the present disclosure.

Storage medium embodiments for providing the program codes include a floppy disk, a hard disk, a magneto-optical disk, an optical disk (such as CD-ROM, CD-R, CD-RW, DVD-ROM, DVD-RAM, DVD-RW or DVD+RW), a magnetic tape, a non-volatile memory card, and a ROM. Alternatively, the program codes may be downloaded from a server computer by a communication network.

In addition, it should be clear that the function of any one of the above embodiments can be implemented not only by executing the program codes read by the computer, but also by enabling an operating system operating on the computer to complete part or all of actual operations on the basis of instructions of the program codes.

In addition, it can be understood that the program codes read from the storage medium are written to a memory provided in an expansion board inserted into the computer or written to a memory provided in an expansion module connected to the computer, and then on the basis of the instructions of the program codes, a CPU installed on the expansion board or expansion module is enabled to perform part or all of actual operations, thereby implementing the function of any one of the above-mentioned embodiments.

Computer Program Product

The teachings of the present application further include a computer program product, which is stored on a non-transitory computer-readable medium and includes computer executable instructions, which, when executed, cause at least one processor to execute one or more of the network configuration methods described herein. It should be understood that each solution in this embodiment has the corresponding technical effects in the above method embodiments, which will not be repeated here.

It should be noted that not all steps and modules in the above-mentioned processes and system structure diagrams are necessary, and some steps or modules may be ignored according to actual needs.

The execution order of the steps is not fixed and may be adjusted as needed. The system structure described in the above-mentioned embodiments may be a physical structure or a logical structure, that is, some modules may be implemented by the same physical entity, or some modules may be implemented by a plurality of physical entities, or some components in a plurality of independent devices may be implemented together.

In the above embodiments, the hardware modules may be implemented mechanically or electrically. For example, a hardware module may include permanent dedicated circuits or logic (such as special processors, FPGA or ASIC) to complete the corresponding operation. The hardware module may also include programmable logic or circuits (such as general-purpose processors or other programmable processors), which may be temporarily set by software to complete the corresponding operation. The specific implementation (mechanical method, or dedicated permanent circuit, or temporarily set circuit) may be determined on the basis of the cost and time considerations.

The present disclosure has been presented and described in detail above through the accompanying drawings and preferred embodiments. However, the scope thereof is not limited to these disclosed embodiments, and it can be known by those skilled in the art on the basis of the above-mentioned multiple embodiments that the code review means in the above-mentioned different embodiments may be combined to obtain more embodiments of the present application, and these embodiments are also within the protection scope of the present disclosure.

What is claimed is:

1. A network configuration method comprising:
   acquiring environmental information of at least two application programs, wherein the environmental information indicates hosts where the application programs are located and a communication mode between the hosts;
   grouping the at least two application programs according to the environmental information to obtain at least one program group, wherein each of the program groups comprises at least two application programs, different program groups correspond to different inter-program communication modes, and the application programs in the same program group communicate with each other through the inter-program communication mode corresponding to the program group;
   determining, according to a communication requirement between the at least two application programs, at least one application program pair that needs to perform communication; and
   configuring, according to the inter-program communication mode corresponding to the program group comprising the application program pair, a communication network for the two application programs comprised in the application program pair;
   wherein grouping the at least two application programs according to the environmental information comprises performing at least one of the following operations according to the environmental information:
   (i) dividing the application programs located on the same host into one program group; and
   (ii) grouping the application programs located on different hosts according to communication modes between the hosts to obtain at least one program group.

2. The method according to claim 1, wherein grouping the application programs located on different hosts according to the communication modes between the hosts comprises:
   dividing at least two application programs located on different hosts into one program group, the hosts communicating with each other through the same local area network; and dividing at least two application programs located on different hosts into one program group, the hosts communicating with each other through a wide area network.

3. The method according to claim 2, wherein configuring, the communication network for the two application programs comprised in the application program pair comprises:
if the application program pair is comprised in a first program group, configuring the communication network for the two application programs comprised in the application program pair through a pre-created memory exchange configuration template, so that the application program pair performs communication through memory exchange, wherein the application programs in the first program group are located on the same host;
if the application program pair is comprised in a second program group, configuring the communication network for the two application programs comprised in the application program pair through a pre-created local area network configuration template, so that the application program pair performs communication through a local area network, wherein the application programs in the second program group are located on different hosts that communicate with each other through the local area network; and
if the application program pair is comprised in a third program group, configuring the communication network for the two application programs comprised in the application program pair through a pre-created wide area network configuration template, so that the application program pair performs communication through a wide area network, wherein the application programs in the third program group are located on different hosts that communicate with each other through the wide area network.

4. The method according to claim 1, further comprising, if an operating environment of the application program is a container, configuring a bridge network for the application program, so that the application program accesses, through the bridge network, a default network and a memory of a host where the application program is located.

5. The method according to claim 1, further comprising:
generating configuration information, wherein the configuration information is used to indicate program group information, application program pair information, and communication network configuration information; and
generating a configuration list comprising the configuration information and transmitting the configuration list.

6. An electronic device comprising:
a processor;
a communication interface;
a memory; and
a communication bus;
wherein the processor, the memory, and the communication interface communicate with each other via the communication bus;
the memory stores at least one executable instruction; and
the executable instruction causes the processor to:
acquire environmental information of at least two application programs, wherein the environmental information indicates hosts where the application programs are located and a communication mode between the hosts;
group the at least two application programs according to the environmental information to obtain at least one program group, wherein each of the program groups comprises at least two application programs, different program groups correspond to different inter-program communication modes, and the application programs in the same program group communicate with each other through the inter-program communication mode corresponding to the program group;
determine, according to a communication requirement between the at least two application programs, at least one application program pair that needs to perform communication; and
configure, according to the inter-program communication mode corresponding to the program group comprising the application program pair, a communication network for the two application programs comprised in the application program pair;
wherein grouping the at least two application programs according to the environmental information comprises performing at least one of the following operations according to the environmental information:
(i) dividing the application programs located on the same host into one program group; and
grouping the application programs located on different hosts according to communication modes between the hosts to obtain at least one program group.

7. The electronic device according to claim 6, wherein grouping the application programs located on different hosts according to the communication modes between the hosts comprises:
dividing at least two application programs located on different hosts into one program group, the hosts communicating with each other through the same local area network; and
dividing at least two application programs located on different hosts into one program group, the hosts communicating with each other through a wide area network.

8. The electronic device according to claim 7, wherein configuring, the communication network for the two application programs comprised in the application program pair comprises:
if the application program pair is comprised in a first program group, configuring the communication network for the two application programs comprised in the application program pair through a pre-created memory exchange configuration template, so that the application program pair performs communication through memory exchange, wherein the application programs in the first program group are located on the same host;
if the application program pair is comprised in a second program group, configuring the communication network for the two application programs comprised in the application program pair through a pre-created local area network configuration template, so that the application program pair performs communication through a local area network, wherein the application programs in the second program group are located on different hosts that communicate with each other through the local area network; and
if the application program pair is comprised in a third program group, configuring the communication network for the two application programs comprised in the application program pair through a pre-created wide area network configuration template, so that the application program pair performs communication through a wide area network, wherein the application programs in the third program group are located on different hosts that communicate with each other through the wide area network.

9. The electronic device according to claim 6, wherein, if an operating environment of the application program is a container, the executable instruction causes the processor to configure a bridge network for the application program, so that the application program accesses, through the bridge network, a default network and a memory of a host where the application program is located.

10. The electronic device according to claim 6, wherein the executable instruction causes the processor to:
- generate configuration information, wherein the configuration information is used to indicate program group information, application program pair information, and communication network configuration information; and
- generate a configuration list comprising the configuration information and transmitting the configuration list.

* * * * *